United States Patent
Duncan et al.

(10) Patent No.: US 10,769,076 B2
(45) Date of Patent: Sep. 8, 2020

(54) DISTRIBUTED ADDRESS TRANSLATION IN A MULTI-NODE INTERCONNECT FABRIC

(71) Applicant: NVIDIA Corporation, Santa Clara, CA (US)

(72) Inventors: Samuel Hammond Duncan, Franklin, MA (US); Sanjeev Jain, Chandler, AZ (US); Mark Douglas Hummel, Franklin, MA (US); Vyas Venkataraman, Sharon, MA (US); Olivier Giroux, Santa Clara, CA (US); Larry Robert Dennison, Mendon, MA (US); Alexander Toichi Ishii, Lebanon, NH (US); Hemayet Hossain, San Jose, CA (US); Nir Haim Arad, Snoqualmie, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/198,649

(22) Filed: Nov. 21, 2018

(65) Prior Publication Data
US 2020/0159669 A1 May 21, 2020

(51) Int. Cl.
  *G06F 9/455* (2018.01)
  *G06F 12/1027* (2016.01)
(52) U.S. Cl.
  CPC .. *G06F 12/1027* (2013.01); *G06F 2212/1044* (2013.01); *G06F 2212/68* (2013.01)
(58) Field of Classification Search
  CPC .. G06F 3/0607; G06F 9/45516; G06F 12/109; G06F 12/1027; G06F 21/6218
  See application file for complete search history.

(56) References Cited

U.S. PATENT DOCUMENTS

| 5,479,627 A | 12/1995 | Khalidi et al. |
| 5,796,978 A * | 8/1998 | Yoshioka ............ G06F 12/1027 711/206 |
| 5,940,869 A | 8/1999 | Schwartz |

(Continued)

FOREIGN PATENT DOCUMENTS

WO 2013186694 A2 12/2013

*Primary Examiner* — Ryan Bertram
*Assistant Examiner* — Trang K Ta
(74) *Attorney, Agent, or Firm* — Leydig, Voit & Mayer, Ltd.

(57) ABSTRACT

Multiprocessor clusters in a virtualized environment conventionally fail to provide memory access security, which is frequently a requirement for efficient utilization in multi-client settings. Without adequate access security, a malicious process may access what might be confidential data that belongs to a different client sharing the multiprocessor cluster. Furthermore, an inadvertent programming error in the code for one client process may accidentally corrupt data that belongs to the different client. Neither scenario is acceptable. Embodiments of the present disclosure provide access security by enabling each processing node within a multiprocessor cluster to virtualize and manage local memory access and only process access requests possessing proper access credentials. In this way, different applications executing on a multiprocessor cluster may be isolated from each other while advantageously sharing the hardware resources of the multiprocessor cluster.

21 Claims, 13 Drawing Sheets

(56) References Cited

U.S. PATENT DOCUMENTS

| | | | |
|---|---|---|---|
| 6,351,795 B1 | 2/2002 | Hagersten | |
| 6,490,671 B1 | 12/2002 | Frank et al. | |
| 6,925,547 B2 | 8/2005 | Scott et al. | |
| 6,928,529 B2 | 8/2005 | Shinomiya | |
| 7,334,076 B2 | 2/2008 | Hendel et al. | |
| 7,428,626 B2 | 9/2008 | Vega | |
| 8,386,745 B2 | 2/2013 | Kegel et al. | |
| 8,484,307 B2 | 7/2013 | Arimilli et al. | |
| 8,566,536 B1* | 10/2013 | Brightwell | G06F 12/109 711/147 |
| 8,719,548 B2 | 5/2014 | Altman et al. | |
| 9,164,920 B2 | 10/2015 | Bennett et al. | |
| 9,213,651 B2 | 12/2015 | Malyugin et al. | |
| 9,361,039 B2 | 6/2016 | Wang et al. | |
| 9,483,400 B2 | 11/2016 | McKinley | |
| 9,886,301 B2 | 2/2018 | Hudzia et al. | |
| 2006/0224815 A1 | 10/2006 | Yamada et al. | |
| 2009/0094430 A1* | 4/2009 | Bergheaud | G06F 9/526 711/163 |
| 2010/0333090 A1* | 12/2010 | Wright | G06F 9/45516 718/1 |
| 2012/0151117 A1* | 6/2012 | Tuch | G06F 12/1491 711/6 |
| 2015/0052287 A1* | 2/2015 | Venkatasubramanian | G06F 9/5033 711/6 |
| 2016/0041922 A1 | 2/2016 | Parks et al. | |
| 2016/0203219 A1 | 7/2016 | Hoch et al. | |
| 2017/0153822 A1* | 6/2017 | Xu | G06F 3/0607 |
| 2017/0168954 A1 | 6/2017 | Meyer et al. | |
| 2017/0177498 A1* | 6/2017 | Wilkes | G06F 12/1027 |
| 2017/0192903 A1 | 7/2017 | Kawamura | |
| 2018/0059974 A1* | 3/2018 | Tsirkin | G06F 21/6218 |
| 2018/0074969 A1 | 3/2018 | Neiger et al. | |
| 2018/0349286 A1* | 12/2018 | Rana | G06F 12/1009 |

* cited by examiner

DISTRIBUTED ADDRESS TRANSLATION IN A MULTI-NODE INTERCONNECT FABRIC

STATEMENT REGARDING FEDERALLY SPONSORED RESEARCH RESEARCH AND DEVELOPMENT

This invention was made with US Government support under Agreement H9823-16-3-0001 awarded by DoD. The US Government has certain rights in this invention.

FIELD OF THE INVENTION

The present invention relates to address translation in processing units, and more particularly to distributed address translation in a multi-node interconnect fabric.

BACKGROUND

Multiprocessor clusters can provide high computational throughput and accommodate large amounts of system memory that can be accessed by a given process family. Virtualization can provide tremendous operational flexibility and efficiency in data centers where high throughput is increasingly demanded. However, current multiprocessor clusters fail to provide memory access security required for virtualization, thereby limiting viability of multiprocessor clusters in many key application areas. Thus, there is a need for addressing these issues and/or other issues associated with the prior art.

SUMMARY

Embodiments of the present disclosure provide access security by enabling each processing node within a multiprocessor cluster to virtualize and manage local memory access and only process access requests possessing proper access credentials. In this way, different applications executing on a multiprocessor cluster may be isolated from each other while advantageously sharing the hardware resources of the multiprocessor cluster.

A method, computer readable medium, and system are disclosed for sharing memory pages in multiprocessor systems having a large overall address space. The method comprises exporting, by a destination node, a local virtual address range into a fabric linear address (FLA) space. The method further comprises configuring, by a source node, one or more page table entries within a local translation lookaside buffer (TLB) to map a virtual address space for the source node to the FLA space. In an embodiment, at least one FLA range of the FLA space is mapped by the destination node to one or more local system physical memory pages comprising a local system physical address (SPA) space for a memory subsystem of the destination node. The method further comprises operations performed by the source node that include: generating a memory access request comprising a virtual address (VA) within the virtual address space that targets data residing in the one or more local system physical memory pages, mapping the VA to a corresponding FLA within the FLA space that targets the data, composing a remote access request that includes the FLA, and transmitting the remote access request to the destination node. The method further comprises operations performed by the destination node that include: mapping the FLA to a corresponding guest physical address (GPA) that targets the data, and mapping the GPA to a corresponding system physical address (SPA) that targets the data within the local SPA space for the memory subsystem.

The computer readable medium includes instructions that, when executed by a multiprocessor system, cause the multiprocessor system to perform the method. Furthermore, the system includes a multiprocessor system configured to perform the method.

DETAILED DESCRIPTION

Embodiments of the present disclosure provide an address translation mechanism for efficiently sharing memory pages in multiprocessor systems having a large overall address space. Furthermore, various embodiments provide mechanisms for managing memory access security in a multiprocessor system. In an embodiment, the multiprocessor system includes a cluster of two or more processing nodes. A processing node may include a GPU and/or central processing unit (CPU) configured to communicate directly or through a switching fabric to one or more other processing nodes. A switching fabric may include one or more fabric switches organized in any technically feasible topology to transmit data between the processing node and the one or more other processing nodes. A fabric linear address (FLA) space is implemented to provide a global virtual address space into which different processing nodes may uniquely map one or more ranges of local physical memory. In this way, shared local physical memory at a given processing node may be accessed by any other processing node or nodes through distinct and manageable address ranges within the FLA space. A given FLA space may include one or more FLA ranges. In an embodiment, a first processing node (source node) requests a memory access to data residing at a second processing node (destination node). The memory access may be processed through the switching fabric.

Figure 1A:
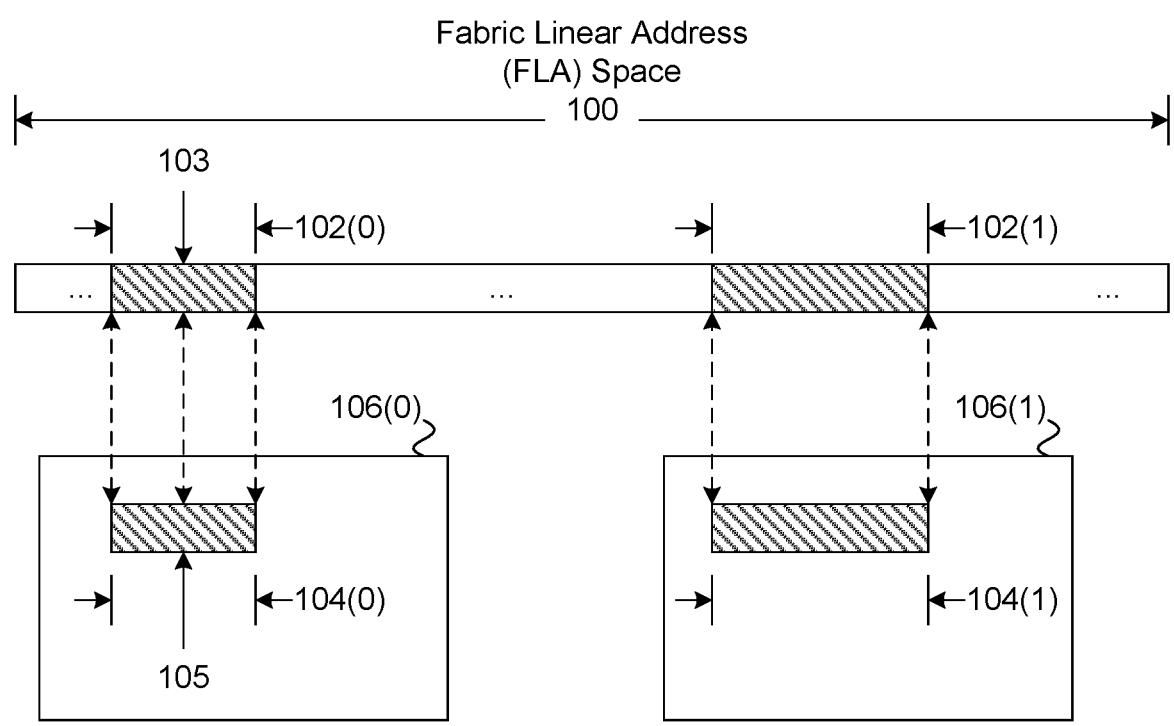
FIG. 1A illustrates a first local virtual address range and a second local virtual address range mapped to a fabric linear address space, in accordance with an embodiment.

Following is a list of acronyms used in the description:
DPC—Data Processing Cluster
FLA—Fabric Linear Address
GPA—Guest Physical Address
GPC—General Processing Clusters
GPU—Graphics Processing Unit
LSU—Load/Store Unit
MMU—Memory Management Unit
PPU—Parallel Processing Unit
PROP—Pre-Raster Operations (unit)
ROP—Raster Operations (unit)
SFU—Special Function Unit
SM—Streaming Multiprocessor
SPA—System Physical Address FIG. 1A illustrates a first local virtual address range 104(0) and a second local virtual address range 104(1) mapped to an FLA space 100, in accordance with an embodiment. The first local virtual address range 104(0) may be associated with physical memory residing at a first processing node 106(0), and second local virtual address range 104(1) may be associated with a physical memory residing at a second processing node 106(1) of a multiprocessor system (e.g. multiprocessor system 210 of FIG. 2). As shown, the first local virtual address range 104(0) is mapped to a first FLA range 102(0) within the FLA space 100, and the second local virtual address range 104(1) is mapped to a second FLA range 102(1) within the FLA space 100.

Figure 1B:
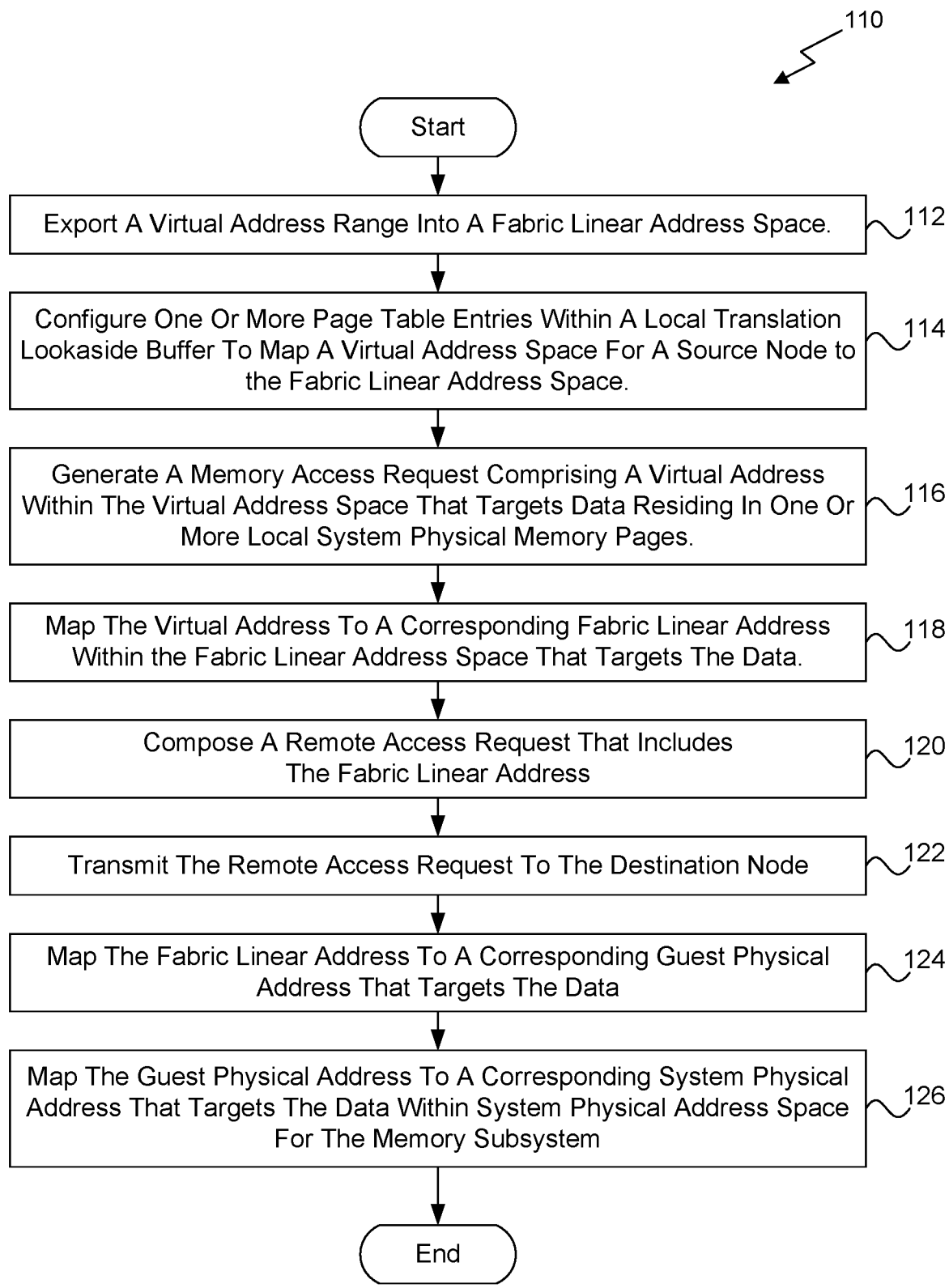
FIG. 1B illustrates a flowchart of a method for sharing memory pages in a multiprocessor system, in accordance with an embodiment.
Figure 1C:
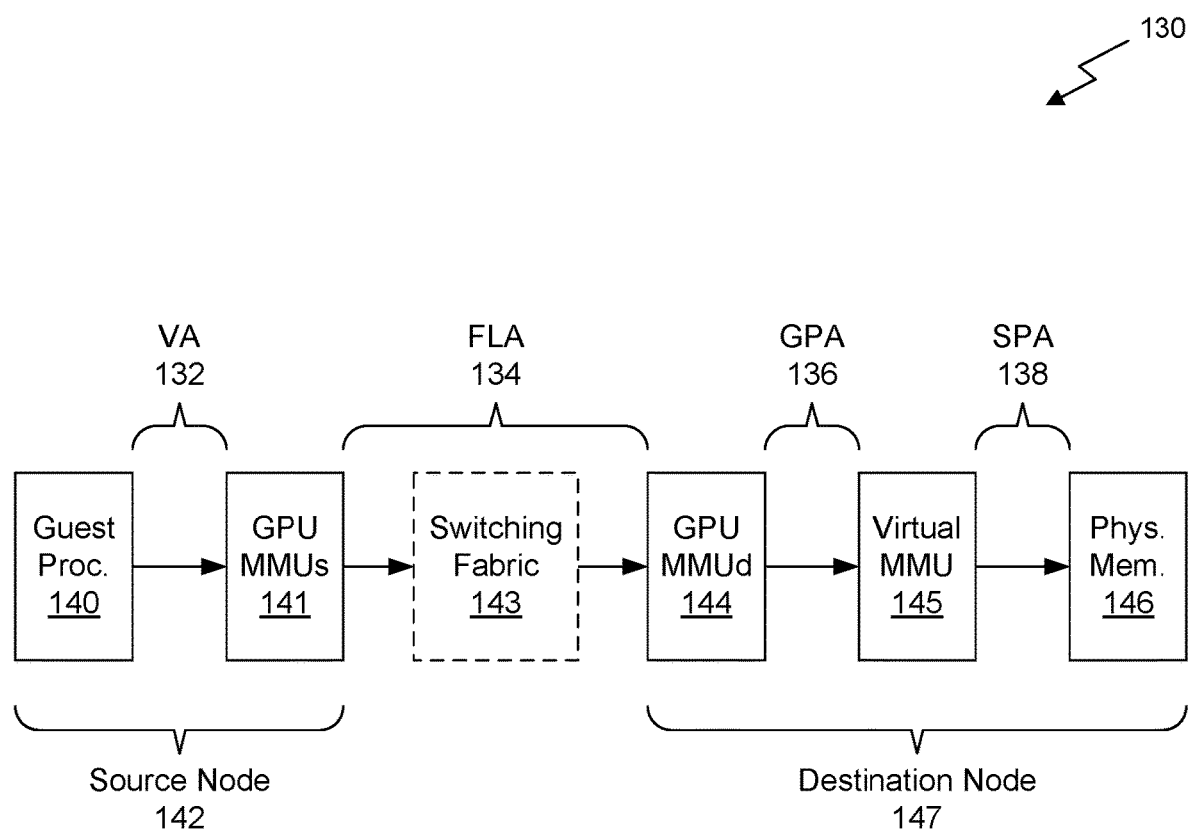
FIG. 1C illustrates a first address mapping pipeline, in accordance with an embodiment.
Figure 1D:
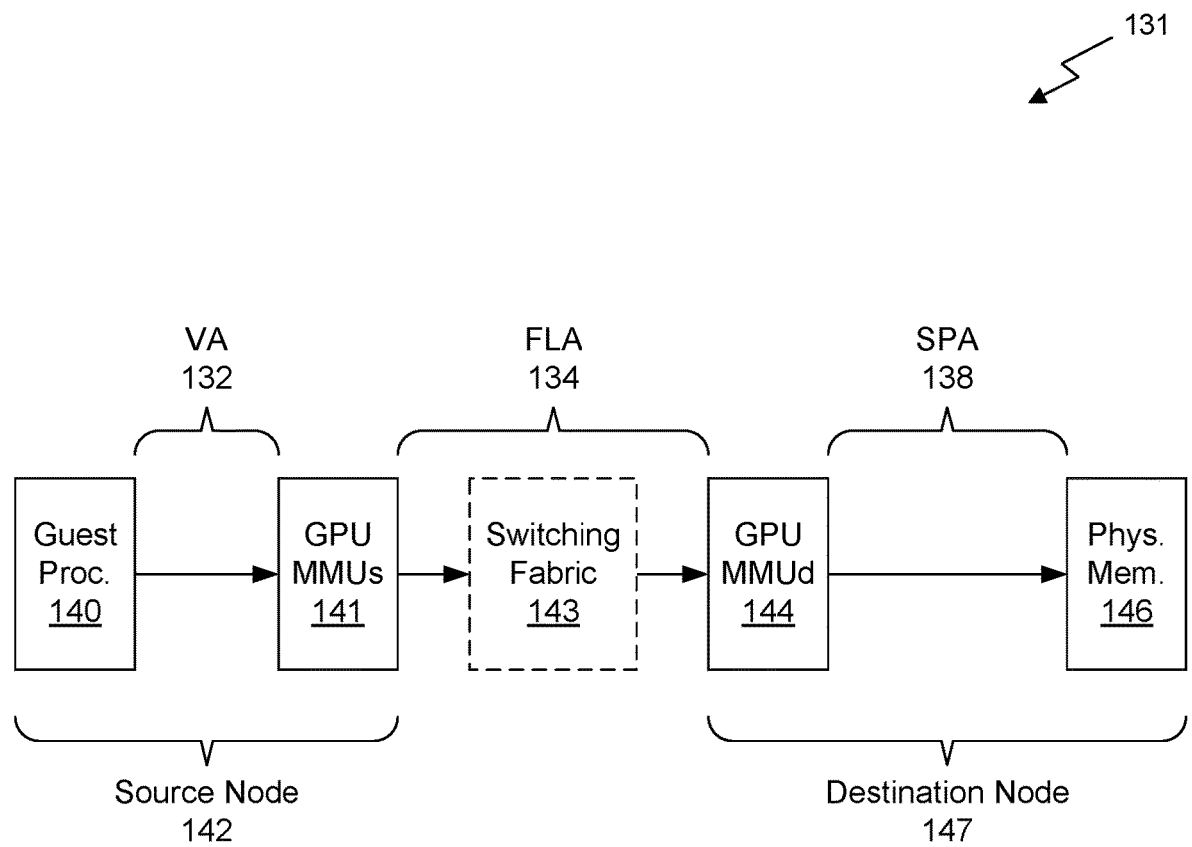
FIG. 1D illustrates a second address mapping pipeline, in accordance with an embodiment.
Figure 1E:
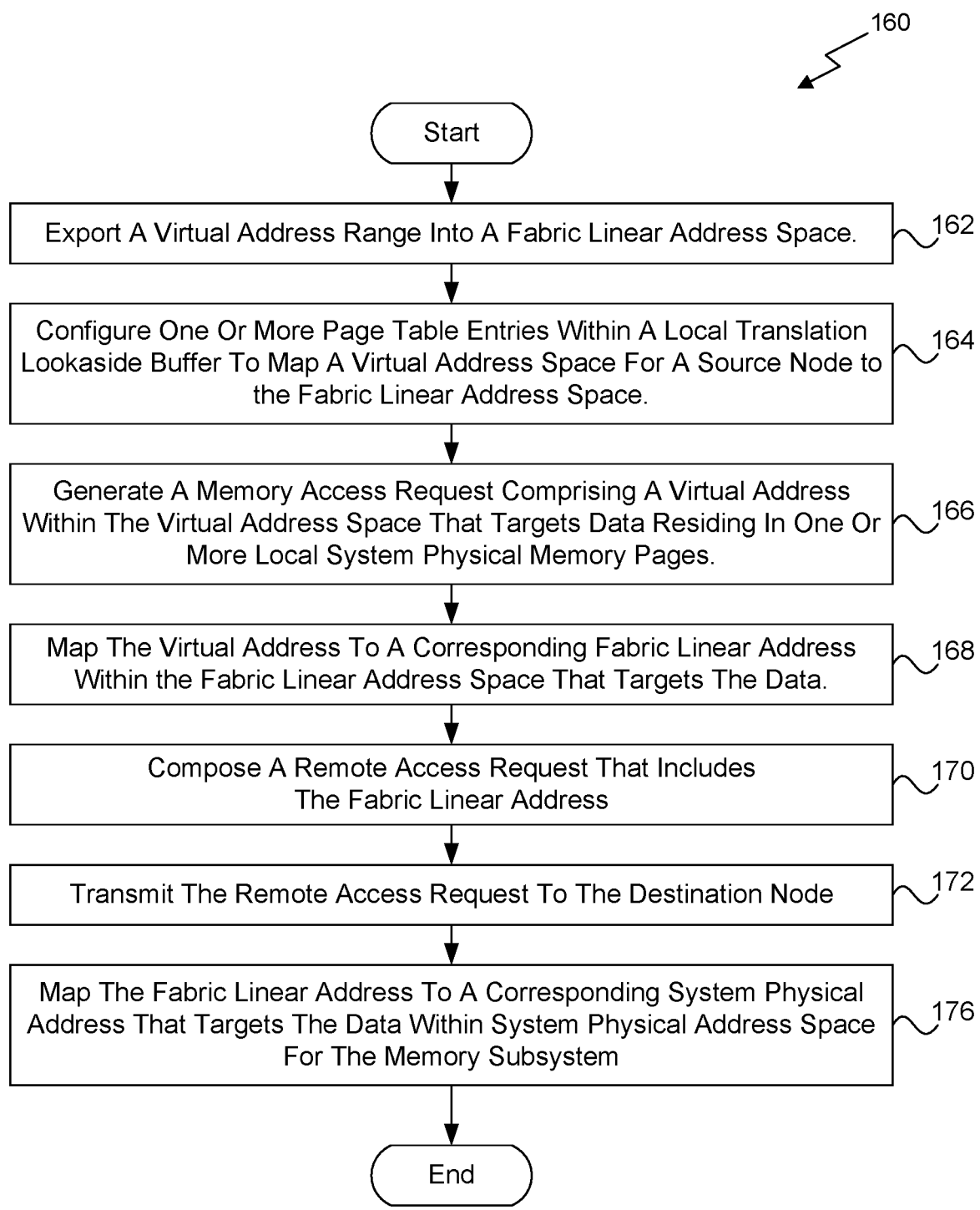
FIG. 1E illustrates a flowchart of a method for sharing memory pages in a multiprocessor system, in accordance with an embodiment.

More generally, in various embodiments, one or more local virtual address ranges 104 associated with one or more processing nodes 106 may be mapped into one or more FLA ranges 102 of the FLA space 100, such as by exporting corresponding local virtual address ranges 104 (e.g., step 112 of method 110 of FIG. 1B or step 162 of method 160 of FIG. 1E). In an embodiment, the FLA space 100 comprises a linear address space that may be uniformly presented to different processing nodes 106. Furthermore, a given FLA space address in the FLA space 100 may be referenced using the same address value by different processing nodes 106. In this way, multiple different processing nodes 106 may export local memory for other processing nodes 106 to access, as well as access remote memory on other processing nodes 106 using a common address space defined by the FLA space 100. For example, a particular item of data may reside in a local memory at a local virtual address 105 within processing node 106(0). The local virtual address 105 is mapped to an FLA space address 103.

In an embodiment, a first remote process with appropriate access permission may access the item of data through FLA space address 103. Furthermore, processing node 106(0), acting as a destination node, maps FLA space address 103 to a system physical address corresponding to local virtual address 105. In this way, the first remote process may access the item of data on memory residing within processing node 106(0). Similarly, a second remote process may access the item of data through FLA space address 103. The first remote process and the second remote process may be affiliated processes and may execute on the same processing node 106 or different processing nodes 106. The processing nodes 106 may be configured to communicate access requests through a switching fabric.

In an embodiment, a multiprocessor application program may be configured to execute as a collection of affiliated processes on one or more processing nodes 106 of the multiprocessor system. Process affiliation may be indicated by a process identifier (ID), an application ID, processing node ID, or any other technically feasible identifier that indicates which processes are affiliated (e.g., with a given application). Furthermore, processes may be considered to be affiliated through a privilege level, security context, or any other technically feasible access qualifier or qualifiers. In an embodiment, a privilege level indicates one of two or more levels of increasing access and control of resources of one or more processing nodes 106. In contrast, a security context may indicate which of one or more specified functions or resources may be accessed and/or controlled by a process executing on one or more processing nodes 106. For example, a privilege level may allow a process to access any data for a specific privilege level, whereas a security context may only allow access to specific data regardless of privilege level. A security context may be specified for a multiprocessor cluster comprising processing nodes 106 a subset of processing nodes 106. Furthermore, a security context may be specified for one or more operating systems or guest operating systems executing on the processing nodes 106. A set of affiliated processes may share data with each other by exporting a virtual address range (e.g., a local virtual address range 104) for shared data into the FLA space 100. In an embodiment, access permission may be granted for affiliated processes to access shared memory segments exported to the FLA space 100. A given virtual address range may map to one or more pages of local physical memory within a system physical address space. As described herein, a processing node 106 that provides the shared data from local physical memory is referred to as the destination node for an access request. Furthermore, a different processing node 106 that is the source of the access request is referred to as the source node for the access request. During operation of the multiprocessor system, a process executing on the source node may generate an access request to a virtual address that maps to data stored at the destination node. Permission to perform a given access request may be granted or denied at the destination node, allowing the destination node to control access policy for data residing locally at the destination node.

Prior to accepting an access request, the destination node exports an FLA range (e.g., a local virtual address ranges 104) corresponding to a window into local memory of the destination node. For example, a process or processes affiliated with the multiprocessor application program (e.g., a portion of the application program) executing on the destination node may request that a region of virtual address space of the process be exported to an FLA range 102 of the FLA space 100, thereby providing a window into local memory of the destination node. Then, memory management software executing on the destination node may generate one or more page table entries to translate from the newly allocated FLA range 102 corresponding to the virtual address space into a guest physical address space. Pages in guest physical address space are not required to be contiguous and can be scattered arbitrarily. Multiple destination node pages may be consolidated into a single FLA range 102 and mapped to one or more pages at the source node.

After the FLA range 102 is allocated, memory management software executing on the source node subscribes to the exported FLA range 102. In an embodiment, the source node subscribes upon receiving a notification that a new FLA range 102 has been exported. For example, the memory management software may receive a notification and, in response, generate page table entries at the source node that map a local virtual address space for the source node into the FLA range 102 exported by the destination node. To generate the page table entries, the memory management software may request access to the FLA range 102 from fabric management software. Alternatively, the notification may provide information for directly generating the page table entries. In an embodiment, the fabric management software is executed by a management processor for an associated switching fabric. In certain embodiments, the source node is coupled directly to the destination node rather than through a switching fabric. In such embodiments, the memory management software may contact an alternative management entity for the FLA space 100, such as a driver process configured to manage both the source node and the destination node. In an embodiment, the memory management software comprises the driver process.

After the source node subscribes to the exported FLA range 102, a process or processes affiliated with the multiprocessor application program executing on the source node may, with appropriate permissions, access data within the exported FLA range 102.

FIG. 1B illustrates a flowchart of a method 110 for sharing memory pages in a multiprocessor system, in accordance with an embodiment. Although method 110 is described in the context of a multiprocessor system comprising a source node (processing subsystem) and a destination node, the method 110 may also be performed by any technically feasible processing system, any custom circuitry, or by a combination of custom circuitry and program instructions. The method 110 may be executed by circuitry within a GPU cluster, circuitry within a CPU cluster, or any other technically feasible multiprocessor system, such as a cluster comprising two or more instances of parallel processing unit (PPU) 300 of FIG. 3 and/or a multiprocessor system 210 of FIG. 2. Furthermore, persons of ordinary skill in the art will understand that any system that performs method 110 is within the scope and spirit of various embodiments. In an embodiment, method 110 is performed by a multiprocessor system comprising a first GPU device within a source node, a second GPU device within a destination node, and a switching fabric configured to provide data communication between the source node and the destination node.

At step 112, the destination node exports a local virtual address range into an FLA space (e.g., FLA space 100 of FIG. 1A). In an embodiment, at least one FLA range (e.g., FLA range 102) of the FLA space is mapped by the destination node (e.g., destination node 147 of FIG. 1C) to one or more local system physical memory pages comprising a local system physical address (SPA) space for a memory subsystem of the destination node, such as local memory 216(1) of FIG. 2. At step 114, the source node configures one or more page table entries within a local translation lookaside buffer (TLB) to map a virtual address space for the source node to the FLA space.

At step 116, the source node generates a memory access request comprising a virtual address (VA) (e.g., VA 132) within the virtual address space that targets data residing in the one or more local system physical memory pages. At step 118, the source node maps the VA to a corresponding FLA (e.g., FLA 134) that targets the data within the FLA space. At step 120, the source node composes a remote access request that includes the FLA. In an embodiment, the FLA is within a specific FLA range 102, which is mapped to the destination node (i.e., a specific processing node 106). In general, a valid FLA falls within a corresponding FLA range 102, which has been previously established through an export operation (e.g., steps 112, 114). At step 122, the source node transmits the remote access request to the destination node.

In an embodiment, the remote access request includes an affiliation identifier for a process that generated the remote access request. In certain embodiments, the remote access request is transmitted through a switching fabric (e.g., switching fabric 143) coupled to the source node and the destination node. Furthermore, in an embodiment, the switching fabric determines whether the remote access request is transmitted to the destination node based on an affiliation identifier and the FLA of the access request.

At step 124, the destination node maps the FLA to a corresponding guest physical address (GPA), such as GPA 136, that targets the data. In an embodiment, a first memory management unit within the source node is configured to map the VA to a corresponding FLA. In certain embodiments, a second memory management unit within the destination node is configured to map the FLA to the GPA. Furthermore, in an embodiment, mapping the FLA to the GPA includes determining whether the memory access request is allowed based on an affiliation identifier and the FLA.

At step 126, the destination node maps the GPA to a corresponding SPA, such as SPA 138, that targets the data within the local SPA space for the memory subsystem. In certain embodiments, method 110 further comprises accessing the data, located at the SPA within the memory subsystem of the destination node.

In an embodiment, a virtual memory management unit within the destination node is configured to map the GPA to the SPA. In an embodiment, the local translation look-aside buffer (TLB) maps a virtual address range to a first FLA range of the FLA space using the one or more page table entries, and a second TLB within the destination node maps the first FLA range to one or more pages within a guest physical address space. In an embodiment, page table entries within the local TLB include a field to indicate whether a virtual address maps to a local memory device or to a remote memory device.

In an embodiment, exporting is initiated by a process with an associated affiliation identifier executing on the destination node. In certain embodiments, configuring the one or more page table entries includes writing the affiliation identifier into the one or more page table entries. In an embodiment, the affiliation identifier comprises at least one of a process identifier (ID), an application ID, processing node ID, a privilege level, of a security context.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 1C illustrates a first address mapping pipeline 130, in accordance with an embodiment. As shown, the first address mapping pipeline 130 includes stages for mapping a VA 132 to an FLA 134 (e.g., FLA space address 123 within FLA space 120) at a source node 142, mapping the FLA 134 to a GPA 136 at a destination node 147, and then mapping the GPA 136 to a local system physical address SPA 138 at the destination node 147. As shown, a guest process 140 executing on the source node 142 generates a memory access request comprising the VA 132 targeting data residing within a physical memory 146 disposed at the destination node 147. The VA 132 is within a virtual address space associated with the guest process 140. The virtual address space can include segments of memory residing both locally on the source node 142 and remotely on one or more destination nodes, such as destination node 147. The guest process 140 may be affiliated with a multiprocessor application program and/or one or more other processes executing on the destination node 147. In an embodiment, method 110 of FIG. 1B is performed in accordance with address mapping pipeline 130.

The guest process 140 transmits the VA 132 to a memory management unit (MMU) that is configured to manage the virtual address space. In this case, the MMU is a source node MMU (MMUs) within a graphics processing unit (GPU), indicated as GPU MMUs 141. In an embodiment, the GPU comprises a parallel processing unit (PPU), such as PPU 300 of FIG. 3 and/or the multiprocessor system 210 of FIG. 2, and the GPU MMU 141 comprises MMU 490 of FIG. 4A and/or GPU MMU 230(0,0). In an embodiment, the GPU MMUs 141 maps the VA 132 to the FLA 134, which may represent a location in the FLA space 120. The mapping from VA 132 to FLA 134 may include any modification or addition to the format of the memory access request to facilitate constructing a memory access request for processing within the FLA space 120. In an embodiment, the GPU MMU 141 constructs a memory access request targeting the FLA 134 within the FLA space 120.

The memory access request may comprise, without limitation, a read request, a write request, an atomic operation, an active memory operation, and/or an active message to a memory location target identified in FLA space 120 by an FLA space address 123. A write request, an atomic operation such as an atomic arithmetic operation, and/or an active memory operation may further include data to be written to a target location identified by the FLA 134. An active message may further include data and/or programming instructions directed to a target location identified by the FLA 134. More generally, the memory access request may include any technically feasible memory access operation and any associated function or functions that operate in conjunction with the memory access operation. At the destination node 147, a destination GPU MMU (GPU MMUd) 144 translates the FLA 134 to the GPA 136.

In an embodiment, the GPA 136 may represent a physical address as reported by a virtual machine runtime environment; however the GPA 136 is typically not a physical address for actual physical memory devices. Instead, in an embodiment, the GPA 136 is a virtual physical address within a virtual physical address space managed by a virtual space MMU 145. The virtual space MMU 145 at the destination node 147 translates the GPA 136 to the SPA 138, which, in an embodiment, is a physical address for tangible, physical memory devices.

In an embodiment, a switching fabric 143 transmits the memory access request from the source node 142 to the destination node 147. In an embodiment, such as an embodiment with only two processing nodes, the source node 142 may be directly coupled to the destination node 147 without an intervening switching fabric.

In an embodiment, when the guest process 140 generates an access request to a local memory device on source node 142, the GPU MMUs 141 maps the access request directly to a local GPA and a local virtual MMU on the source node 142 maps the GPA to an SPA on the source node 142. In an embodiment, page table entries (PTEs) for the GPU MMUs 141 each include a field that indicates whether a corresponding virtual address range maps to local system physical memory or to an FLA (remote system physical memory). In an embodiment, a guest operating system (OS) executing on the source node 142 manages a local instance of the GPU MMUs 141 and a hypervisor executing on the destination node 147 manages the virtual MMU 145.

In an embodiment, an additional translation from FLA space 120 to a GPU MMU address space at the destination node 147 may be performed. A GPU MMU address may then be mapped to the GPA address with further mapping to an SPA. In such embodiments, a page within FLA space could represent memory segments where segment addresses are mapped to the GPU MMU space. Access controls/security may be implemented at the destination node in the mapping from FLA space to GPU MMU address space.

In an embodiment, large TLB page sizes (e.g., 512 MB or larger) for TLB entries are implemented as an option at the source node 142. Each large TLB page can be used to represent a shared, contiguous FLA range 122. The large page size can provide for efficient TLB management at the source node 142, and a given large FLA range 122 can be mapped to smaller, potentially non-contiguous physical pages on the destination node 147 for efficient local memory management. A large page size at source node 142 increases a working set footprint without increasing TLB entry count. This efficiency in a multiprocessor context is facilitated by the global FLA space 120. In an embodiment, the size of a virtual address range mapped by a local TLB page (i.e., TLB page size) at the source node 142 is an arbitrarily large power of two times the size of a physical page at the destination node 147. In certain embodiments, the TLB page size at the source node 142 is at least four times the size of a physical page at the destination node 147. For example, in an embodiment, the TLB page size at the source node 142 may be 512 MB, while the size of a physical page at the destination node 147 is 4 KB (TLB page size is 2 to the power 17 times larger than physical page). In another example, the TLB page size at the source node 142 may be 512 MB, while the size of a physical page at the destination node 147 is 2 MB (TLB page size is 2 to the power 8 times larger than physical page). In this way, the destination node 147 has flexibility managing physical pages, while presenting a contiguous 512 MB page to the source node 142. More generally, the FLA space 120 isolates a virtual address at the source node 142 from a corresponding physical address mapping, thereby allowing the allocation of large (e.g., hundreds of megabytes to gigabytes) contiguous regions (e.g., chunks) in FLA space 120, while decoupling any potential fragmentation issues due to physical memory allocation at the destination node 147. The ability to allocate large, contiguous regions in FLA space 120 allows the source node 142 to map very large memory spaces in FLA space 120 with a relatively small number of TLB entries.

FIG. 1D illustrates a second address mapping pipeline 131, in accordance with an embodiment. As shown, the address mapping pipeline 131 includes stages for mapping a VA 132 to an FLA 134 at a source node 142, and mapping a FLA 134 to a local SPA 138 at a destination node 147. Relative to address mapping pipeline 130 of FIG. 1C, address mapping pipeline 131 removes one stage of address virtualization at the destination node 147, and effectively removes the virtual MMU 145. Furthermore, the address mapping pipeline 131 provides for the GPU MMUd 144 to map the FLA 134 directly to the SPA 138. While the address mapping operation provided by the virtual MMU 145 is removed, the advantage of different processing nodes being able to share a common address space in the FLA space 120 is preserved. In an embodiment, the switching fabric 143 is not included and the source node 142 and the destination node 147 are configured to communicate directly. The address mapping pipeline 131 may provide greater efficiency and/or less complexity in applications where the multiprocessor system is entirely dedicated to executing an application comprising affiliated processes in which memory access and isolation requirements for local memory resources are less stringent.

FIG. 1E illustrates a flowchart of a method 160 for sharing memory pages in a multiprocessor system, in accordance with an embodiment. Although method 160 is described in the context of a multiprocessor system comprising a source node (processing subsystem) and a destination node, the method 160 may also be performed by any technically feasible processing system, any custom circuitry, or by a combination of custom circuitry and program instructions. The method 160 may be executed by circuitry within a GPU cluster, circuitry within a CPU cluster, or any other technically feasible multiprocessor system, such as a cluster comprising two or more instances of parallel processing unit (PPU) 300 of FIG. 3 and/or a multiprocessor system 210 of FIG. 2. Furthermore, persons of ordinary skill in the art will understand that any system that performs method 160 is within the scope and spirit of various embodiments. In an embodiment, method 160 is performed by a multiprocessor system comprising a first GPU device within a source node, a second GPU device within a destination node, and a switching fabric configured to provide data communication between the source node and the destination node. In an embodiment, the method 160 may be performed in accordance with the second address mapping pipeline 131 of FIG. 1D.

At step 162, the destination node exports a local virtual address range into an FLA space. In an embodiment, at least one FLA range of the FLA space is mapped by the destination node to one or more local system physical memory pages comprising a local SPA space for a memory subsystem of the destination node. At step 164, the source node configures one or more page table entries within a local translation lookaside buffer (TLB) to map a virtual address space for the source node to the FLA space. In an embodiment, the one or more page table entries represent a cached version of local page table address mappings.

At step 166, the source node generates a memory access request comprising a VA within the virtual address space that targets data residing in the one or more local system physical memory pages. At step 168, the source node maps the VA to a corresponding FLA that targets the data within the FLA space. At step 170, the source node composes a remote access request that includes the FLA. At step 172, the source node transmits the remote access request to the destination node. At step 176, the destination node maps the FLA to a corresponding SPA that targets the data within the local SPA space for the memory subsystem. In an embodiment, method 160 further comprises accessing the data, located at the SPA within the memory subsystem of the destination node.

Figure 2:
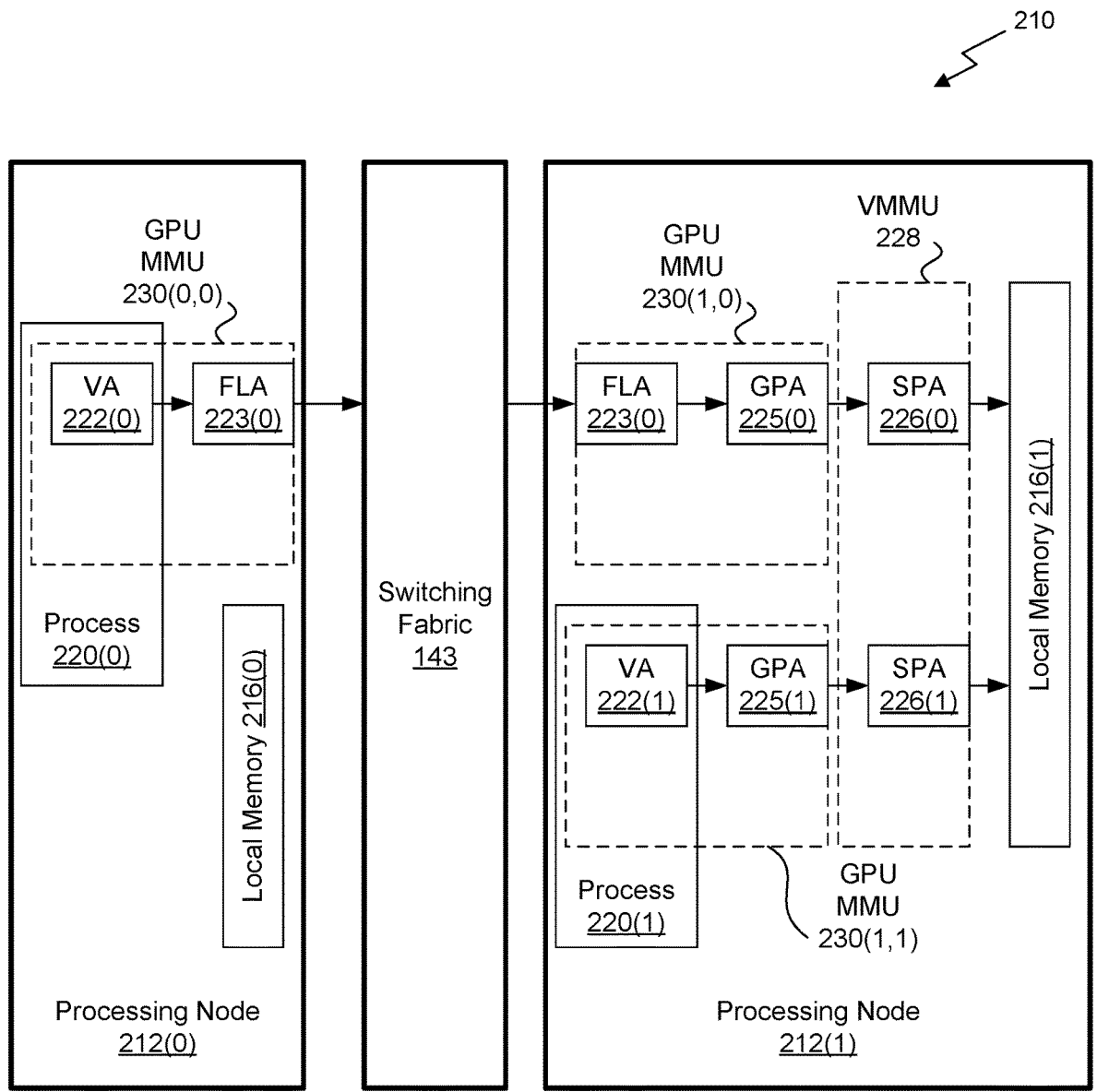
FIG. 2 illustrates a multiprocessor system comprising a first processing node coupled to a second processing node through a switching fabric, in accordance with an embodiment.

FIG. 2 illustrates a multiprocessor system 210 comprising a first processing node 212(0) coupled to a second processing node 212(1) through a switching fabric 143, in accordance with an embodiment. The first processing node 212(0) may include a local memory 216(0), such as a DRAM-based memory subsystem, a flash memory subsystem, or any other type of technically feasible memory circuits and/or subsystems. The local memory 216(0) may be coupled to one or more processing units (GPUs, CPUs, etc.) within the processing node 212(0). Similarly, the second processing node 212(1) includes a local memory 216(1) coupled to one or more processing units within the processing node 212(1).

The first processing node 212(0) is configured to execute a process 220(0) within a first virtual memory space that is managed by a GPU MMU 230(0,0). During normal operation, the process 220(0) may generate a memory access request targeting a VA 222(0) that corresponds, through address mapping, to a remote memory location. In this example, the remote memory location is within the local memory 216(1) of the second processing node 212(1). Because VA 222(0) targets a remote memory location, GPU MMU 230(0,0) maps the VA 222(0) to an FLA 223(0) to generate an FLA memory access request comprising FLA 223(0). The first processing node 212(0) transmits the FLA memory access request to the switching fabric 143, which then transmits the FLA memory access request to the second processing node 212(1). A GPU MMU 230(1,0) within the second processing node 212(1) maps the FLA 223(0) of the FLA memory access request to a GPA 225(0). A virtual space memory management unit (VMMU) 228 is configured to map the GPA 225(0) to a corresponding system physical address SPA 226(0), which may then be used to perform a memory access operation on local memory 216(1). In this way, the process 220(0) may execute on processing node 212(0) and perform memory access operations to a remote memory, such as the local memory 216(1) of the second processing node 212(1). Furthermore, in this example processing node 212(0) is acting as a source node (e.g., source node 142 of FIG. 1C), and processing node 212(1) is acting as a destination node (e.g., destination node 147). In an embodiment, VMMU 228 comprises virtual space MMU 145 of FIG. 1C.

In general, GPU MMU 230(1,0) may be configured to receive an FLA memory access request from the switching fabric 143 and map an FLA, such as FLA 223(0), comprising the FLA memory access request to a corresponding guest physical addresses, such as GPA 225(0). The GPA 225(0) may then be further mapped to a system physical memory, such as SPA 226(0) for accessing physical memory circuits comprising local memory 216(1).

In certain embodiments, memory access requests from a local process 220 to a local memory 216 within a given processing node 212 may bypass address mapping to the FLA space and instead follow a local memory access path. In an embodiment, the local memory access path includes a GPU MMU 230(1,1) configured to receive a memory access request from locally executing process 220(1) and map a VA 222(1) associated with the memory access request to a GPA 225(1). The VMMU 228 then maps the GPA 225(1) to an SPA 226(1), which can be used to access the local memory 216(1).

A given processing node 212 may map certain regions (e.g., a local virtual address range 124) of local memory 216 to the FLA space 120, while keeping certain other regions private for local processes 220 executing on the processing node 212. Furthermore, the processing node 212 may only allow access requests from specific remote and/or local processes 220 (e.g., indicated by a process affiliation identifier or identifiers included in an access request). In this way, access control and access security to local memory 216 may be locally managed by the processing node 212. Additional security may be provided by the switching fabric 143, which may be configured to only allow specific processes 220 and/or certain processing nodes 212 to have access to specific address ranges within the FLA space 120. For example, the switching fabric 143 may restrict access to a given FLA range 122 based on a combination of an FLA space address 123 and one or more process affiliation identifiers.

In certain operating scenarios, a process 220 may request data using a virtual address without a valid or permitted mapping to physically stored data. Such a request is referred to as a translation fault. In an embodiment, the address mapping pipeline 130 or 131 may be configured to return a privilege error when there is a translation fault at the destination. The source node may then terminate the offending guest process (including related processes) when this happens. In an embodiment, the source node may generate a restartable page fault exception when a translation fault occurs. Any technically feasible techniques may be performed to handle these fault conditions.

A method, computer readable medium, and system are disclosed for sharing memory pages in multiprocessor systems having a large overall address space. A multiprocessor system in this context comprises multiple processing nodes that may be communicatively coupled together directly or through a switching fabric. Each processing node may include one or more processors and local memory. Address ranges of the local memory of different processing nodes may be exported into a unified address space referred to herein as a fabric linear address (FLA) space. The address ranges may be exported as virtual address ranges, providing a mapping from the local memory into the FLA space. An exported range may be accessed by any remote process or remote processing node possessing appropriate access credentials through an FLA space address. In an embodiment, to access a remote memory location, a local process generates a memory access request comprising a VA from a local virtual address space. The VA is locally mapped to an FLA, which comprises an address for a memory access request. A remote destination node maps the FLA to a local GPA and then maps the GPA to a local SPA, which is used to address memory at the remote processing node. In this way, multiple processes on different processing nodes may access a large, shared address space.

Parallel Processing Architecture

Figure 3:
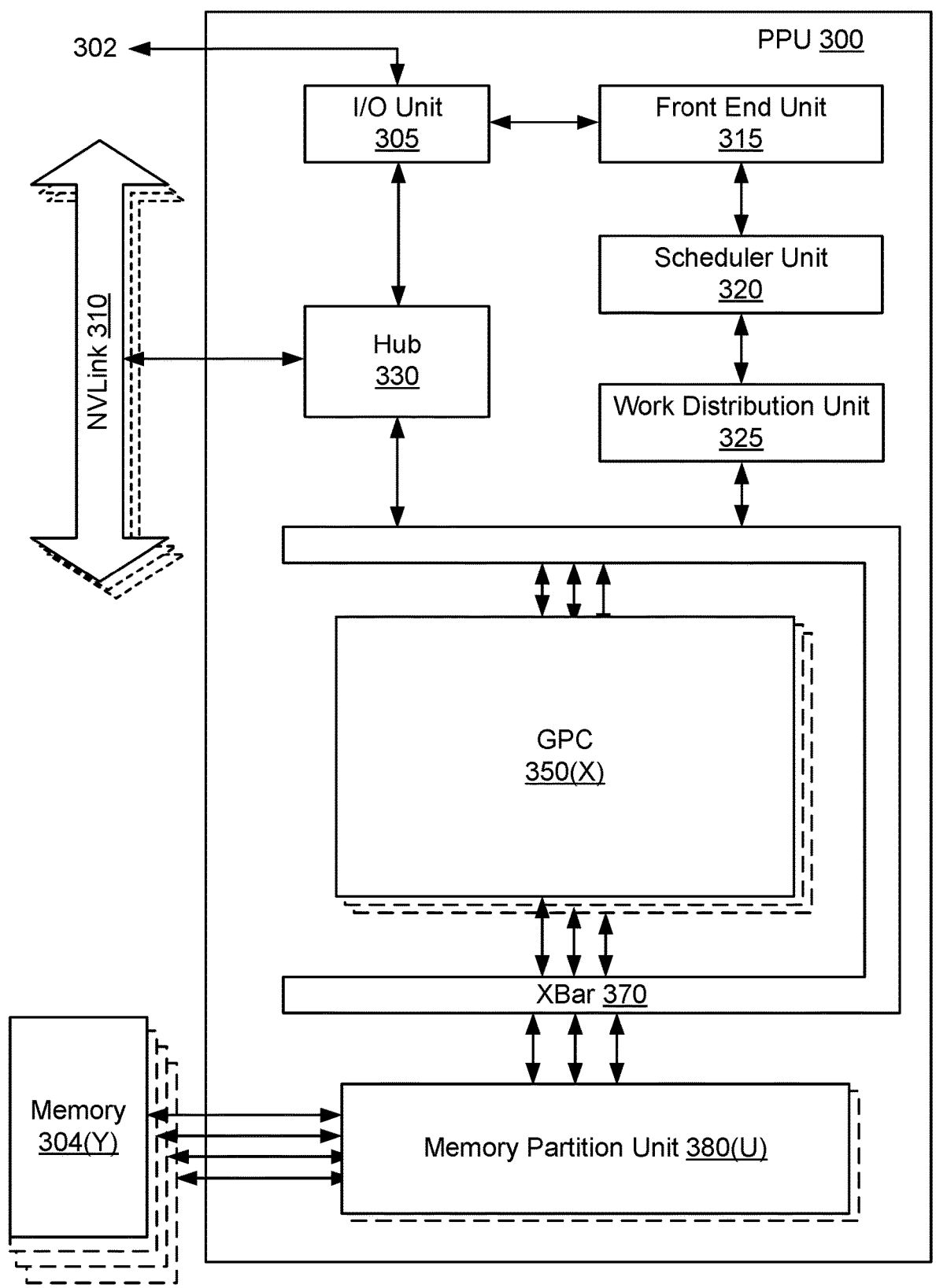
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
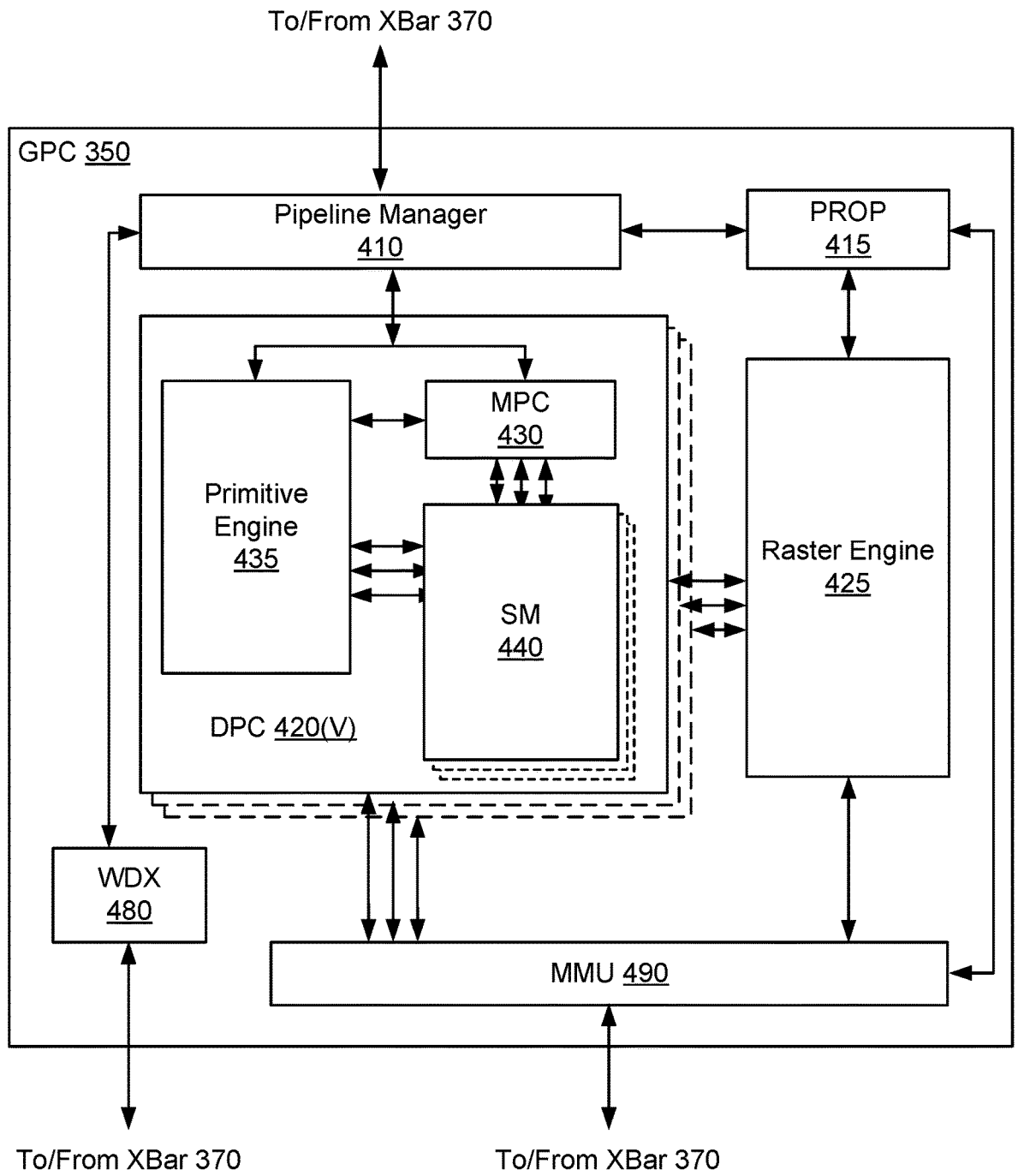
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
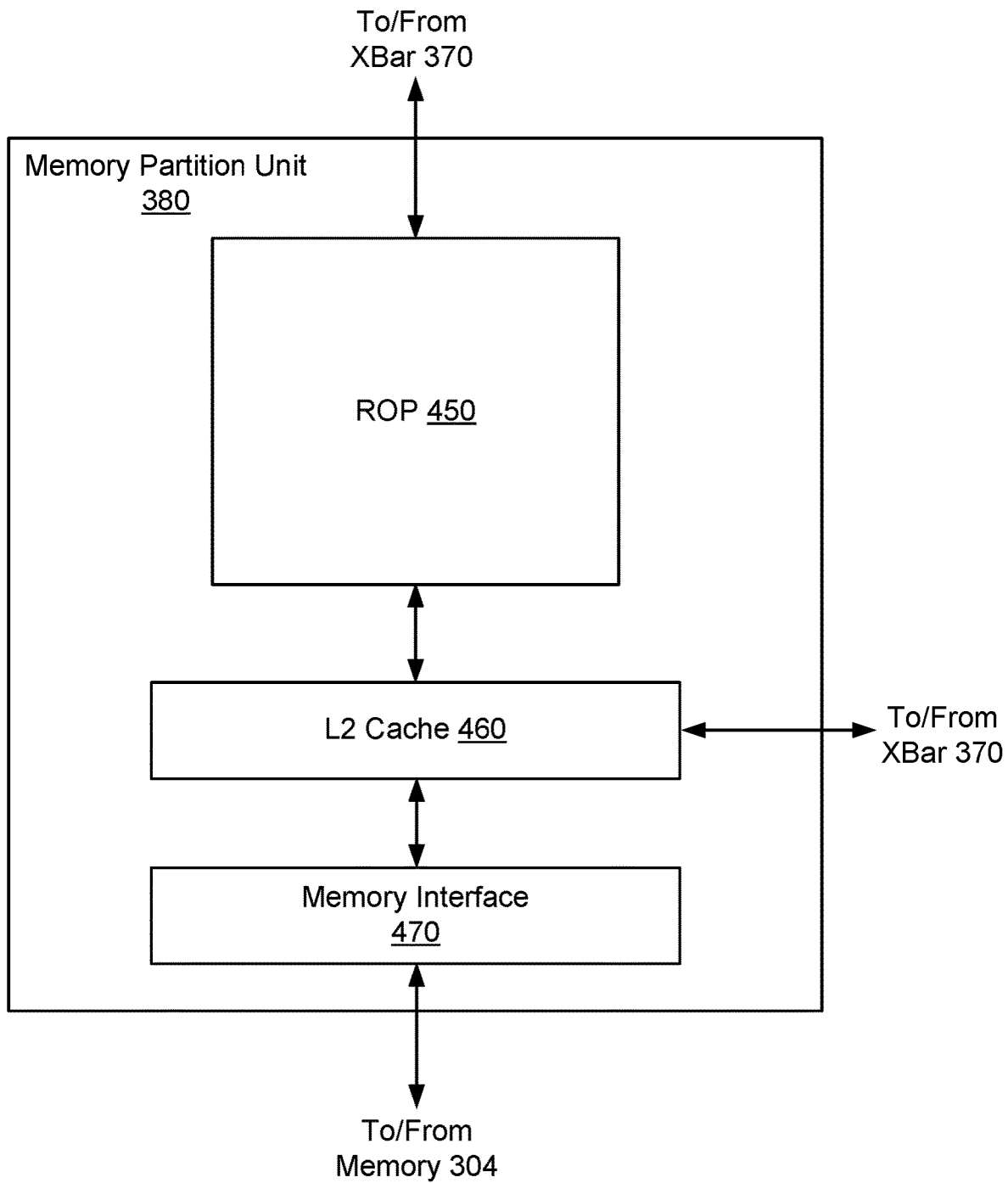
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
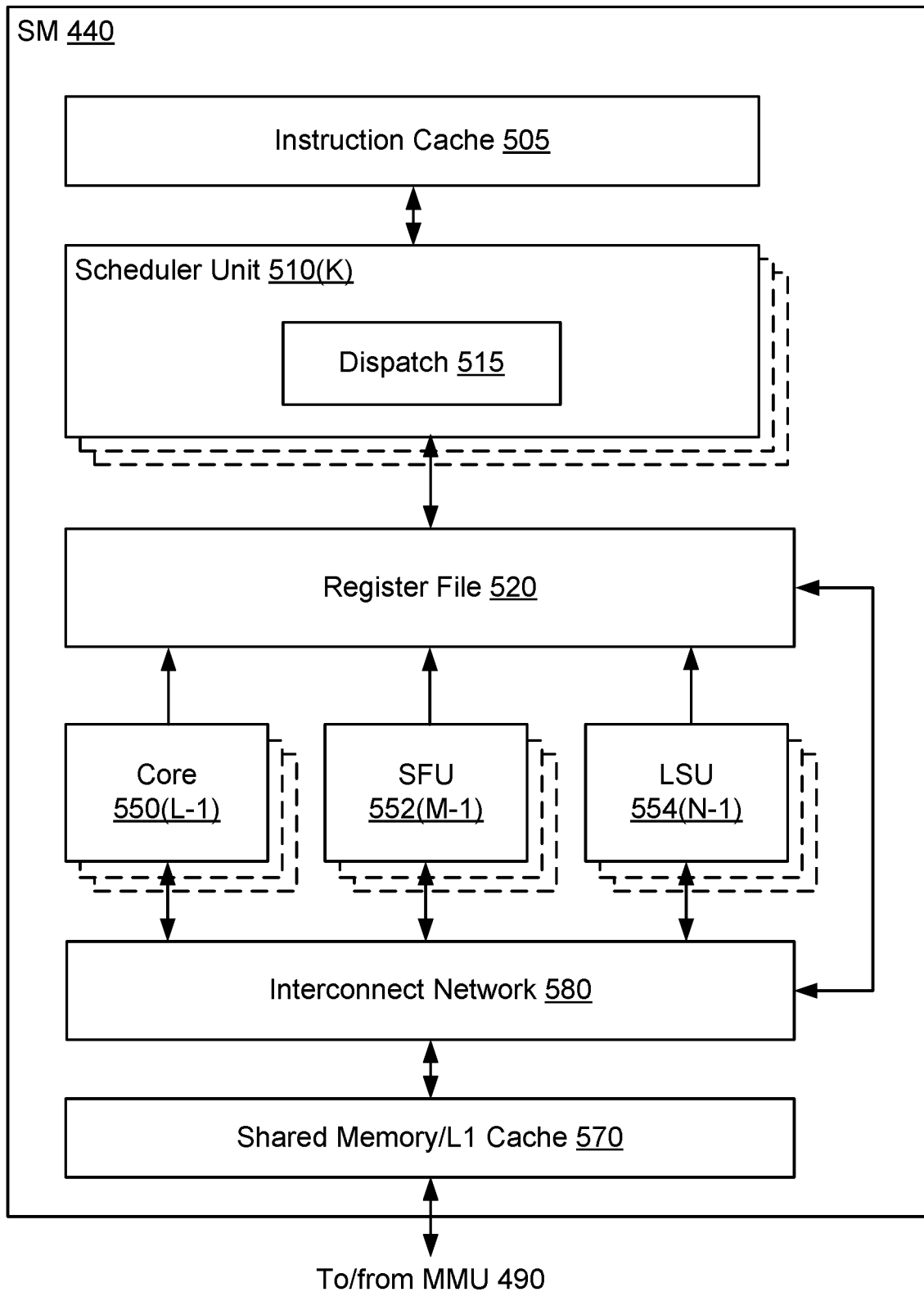
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units. In an embodiment, at least one of SFUs 552 is configured to include at least one instance of texture map unit 200.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased.

Figure 5B:
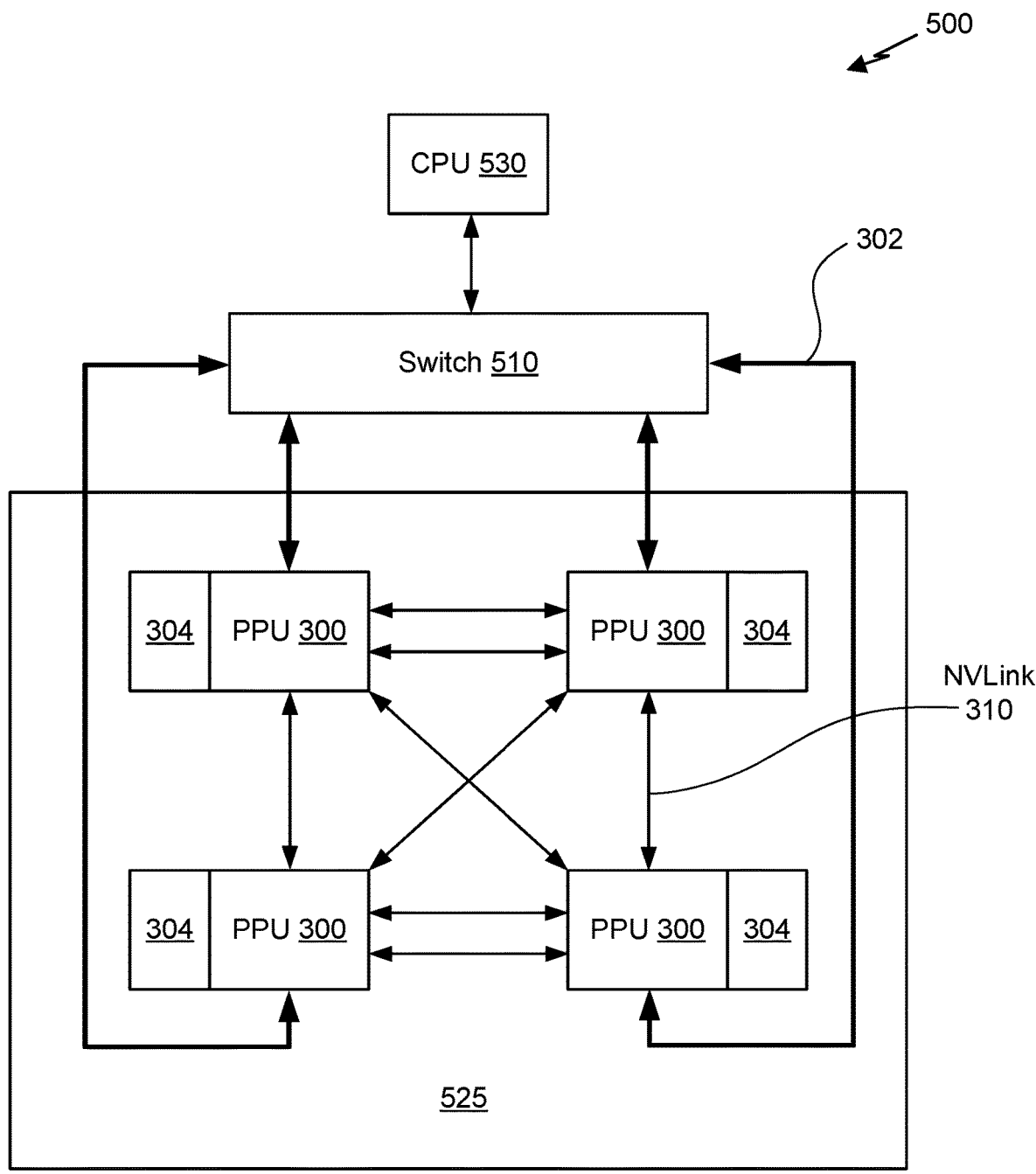
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 may be configured to implement the method 110 shown in FIG. 1B. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user.

Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
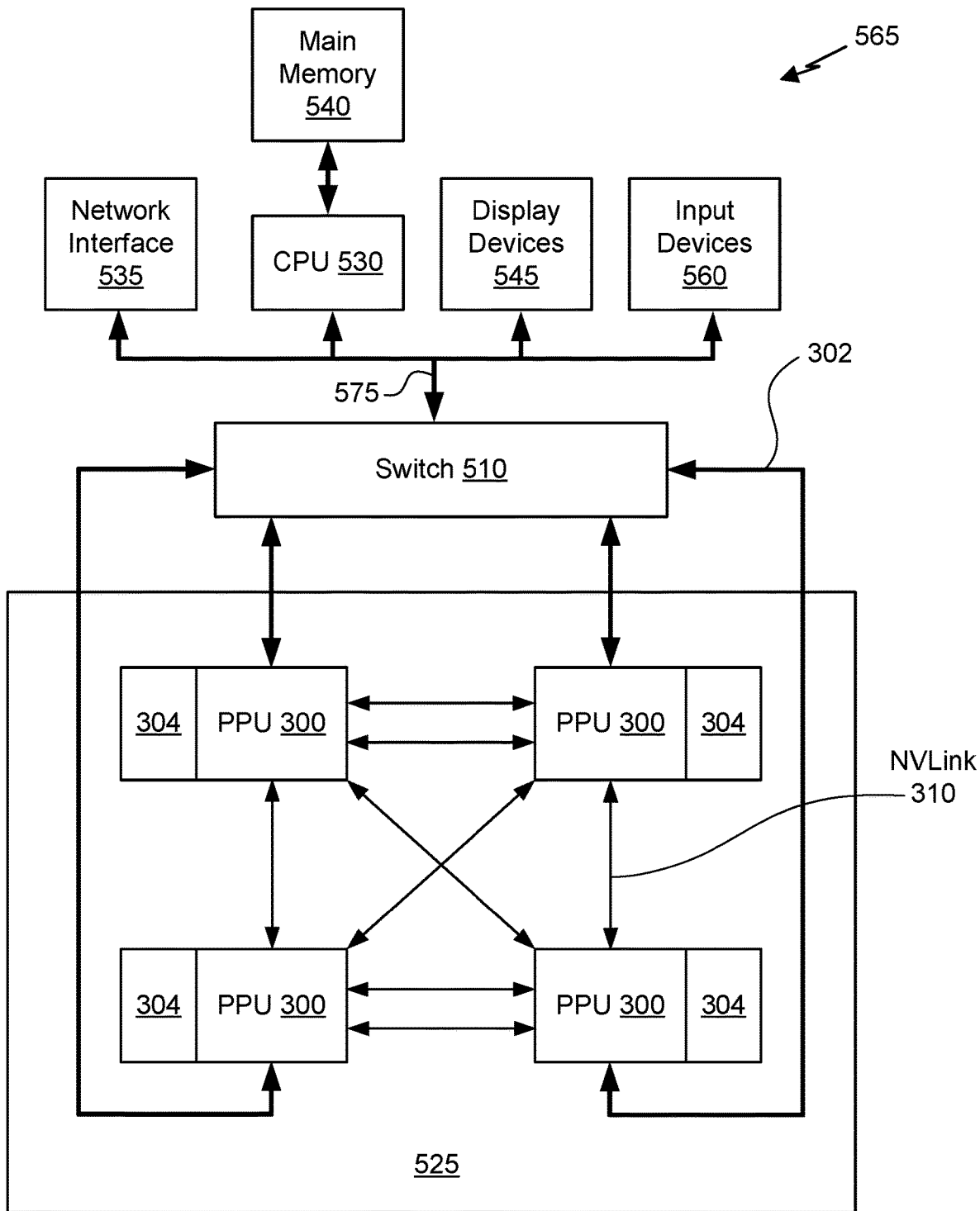
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 110 shown in FIG. 1B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
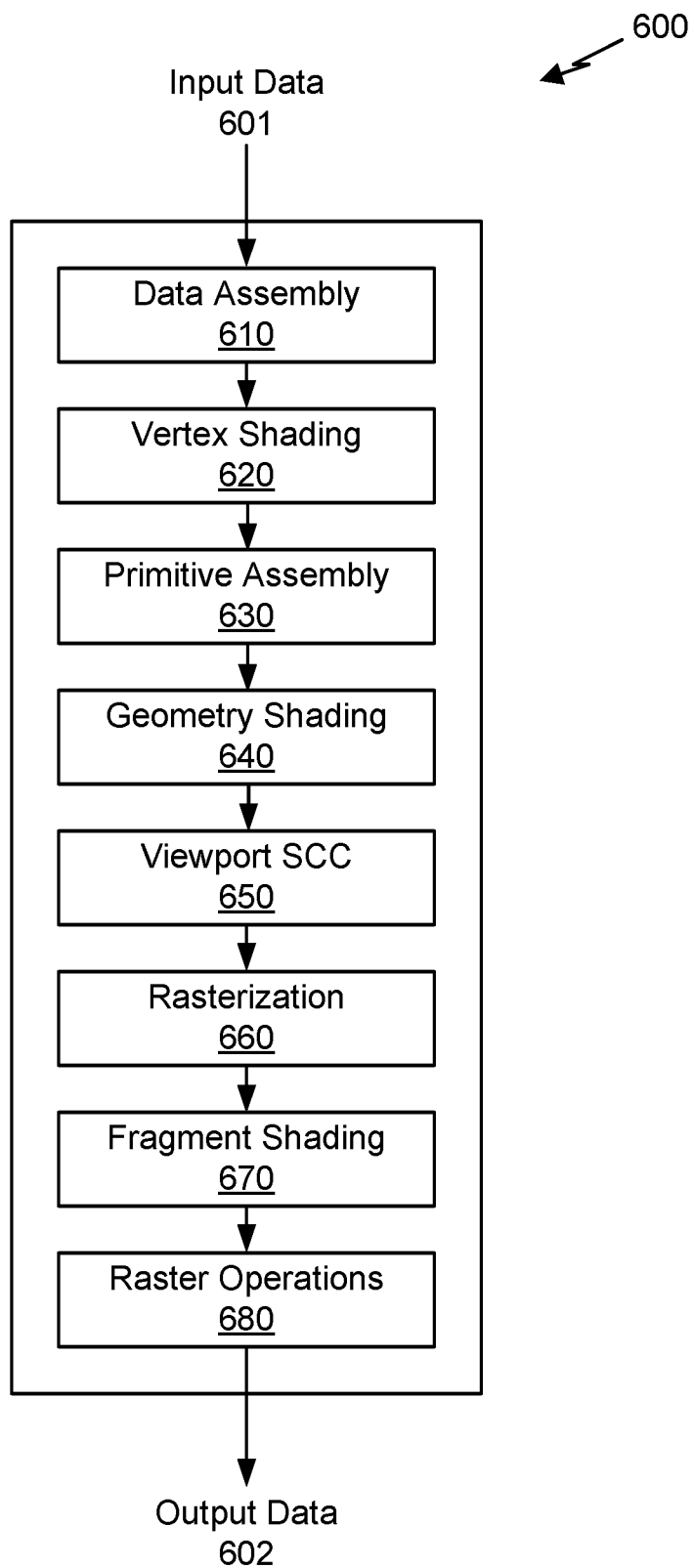
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (SCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A method, comprising:
    exporting, by a destination node executing a process associated with an affiliation identifier, a first virtual address range into a first fabric linear address (FLA) range within a FLA space for sharing data residing in one or more local system physical memory pages within the destination, wherein the exporting is initiated by the process and the first FLA range is mapped by the destination node to the one or more local system physical memory pages comprising a local system physical address (SPA) space for a memory subsystem within the destination node;
    configuring, by a source node executing at least one other process that is associated with the affiliation identifier, one or more page table entries within a local translation lookaside buffer (TLB) to map a second virtual address range for the source node to the first FLA range, wherein the second virtual address range is mapped by one TLB entry with a size that is larger than a physical page size at the destination node;
    generating, by the source node, a memory access request comprising a virtual address (VA) within the second virtual address range that targets the data;
    mapping, by the source node, the VA to a FLA within the first FLA range that targets the data;
    composing, by the source node, a remote access request that includes the FLA;
    transmitting, by the source node, the remote access request to the destination node;
    mapping, by a second TLB within the destination node, the FLA to a guest physical address (GPA) that targets the data; and
    mapping, by the destination node, the GPA to a SPA that targets the data within the local SPA space.

2. The method of claim 1, wherein the remote access request includes the affiliation identifier.

3. The method of claim 2, wherein the remote access request is transmitted through a switching fabric coupled to the source node and the destination node.

4. The method of claim 3, wherein the switching fabric determines whether the remote access request is transmitted to the destination node based on the affiliation identifier and the FLA of the remote access request.

5. The method of claim 2, wherein mapping the VA to the FLA is performed by a first memory management unit within the source node.

6. The method of claim 2, wherein mapping the FLA to the GPA is performed by a first memory management unit within the destination node.

7. The method of claim 6, wherein mapping the FLA to the GPA includes determining whether the memory access request is allowed based on a the affiliation identifier and the FLA.

8. The method of claim 1, wherein mapping the GPA to the SPA is performed by a virtual memory management unit within the destination node.

9. The method of claim 1, further comprising accessing the data, located at the SPA, within the memory subsystem of the destination node.

10. The method of claim 1, wherein the second TLB within the destination node maps the first FLA range to one or more pages within a GPA space.

11. The method of claim 1, wherein the size is a power of two times larger than the physical page size at the destination node.

12. The method of claim 1, wherein page table entries within the local TLB include a field to indicate whether a VA maps to a local memory device or a remote memory device.

13. The method of claim 1, wherein, in response to receiving a notification that the first FLA range is exported, the at least one other process configures the one or more page table entries within the local TLB.

14. The method of claim 1, wherein the affiliation identifier comprises at least one of a privilege level or a security context.

15. The method of claim 14, where the security context indicates which of one or more specified functions or resources may be accessed by the process.

16. A multiprocessor system, configured to:
export, by a destination node executing a process associated with an affiliation identifier, a first virtual address range into a first fabric linear address (FLA) range within a FLA space for sharing data residing in one or more local system physical memory pages within the destination, wherein the exporting is initiated by the process and the first FLA range is mapped by the destination node to one or more local system physical memory pages comprising a local system physical address (SPA) space for a memory subsystem within the destination node;
configure, by a source node executing at least one other process that is associated with the affiliation identifier, one or more page table entries within a local translation lookaside buffer (TLB) to map a second virtual address range for the source node to the first FLA range, wherein the second virtual address range is mapped by one TLB entry with a size that is larger than a physical page size at the destination node;
generate, by the source node, a memory access request comprising a virtual address (VA) within the second virtual address range that targets the data;
map, by the source node, the VA to a corresponding FLA within the first FLA range that targets the data;
compose, by the source node, a remote access request that includes the FLA;
transmit, by the source node, the remote access request to the destination node;
map, by a second TLB within the destination node, the FLA to a corresponding guest physical address (GPA) that targets the data; and
map, by the destination node, the GPA to a corresponding SPA that targets the data within the local SPA space.

17. The multiprocessor system of claim 16, further comprising a switching fabric, wherein the remote access request is transmitted through a switching fabric coupled to the source node and the destination node based on the affiliation identifier and the FLA of the access request.

18. The multiprocessor system of claim 16, wherein, in response to receiving a notification that the first FLA range is exported, the at least one other process configures the one or more page table entries within the local TLB.

19. The multiprocessor system of claim 16, wherein the second TLB within the destination node maps the first FLA range to one or more pages within a GPA space.

20. A non-transitory, computer-readable storage medium storing instructions that, when executed by a multiprocessor system, cause the multiprocessor system to:
export, by a destination node executing a process associated with an affiliation identifier, a first virtual address range into a first fabric linear address (FLA) range within a FLA space for sharing data residing in one or more local system physical memory pages within the destination, wherein the exporting is initiated by the process and the first FLA range is mapped by the destination node to one or more local system physical memory pages comprising a local system physical address (SPA) space for a memory subsystem within the destination node;
configure, by a source node executing at least one other process that is associated with the affiliation identifier, one or more page table entries within a local translation lookaside buffer (TLB) to map a second virtual address range for the source node to the first FLA range, wherein the second virtual address range is mapped by one TLB entry with a size that is larger than a physical page size at the destination node;
generate, by the source node, a memory access request comprising a virtual address (VA) within the second virtual address range that targets the data;
map, by the source node, the VA to a corresponding FLA within the first FLA range that targets the data;
compose, by the source node, a remote access request that includes the FLA;
transmit, by the source node, the remote access request to the destination node;
map, by the destination node, the FLA to a corresponding guest physical address (GPA) that targets the data; and
map, by a second TLB within the destination node, the GPA to a corresponding SPA that targets the data within the local SPA space.

21. A method, comprising:
exporting, by a destination node executing a process associated with an affiliation identifier, a first virtual address range into a fabric linear address (FLA) range within a FLA space for sharing data residing in one or more local system physical memory pages within the destination, wherein the exporting is initiated by the process and the first FLA range is mapped by the destination node to one or more local system physical memory pages comprising a local system physical address (SPA) space for a memory subsystem within the destination node;
configuring, by a source node executing at least one other process that is associated with the affiliation identifier, one or more page table entries within a local translation lookaside buffer (TLB) to map a second virtual address range for the source node to the first FLA range, wherein the second virtual address range is mapped by one TLB entry with a size that is larger than a physical page size at the destination node;

generating, by the source node, a memory access request comprising a virtual address (VA) within the second virtual address range that targets the data;

mapping, by the source node, the VA to a corresponding FLA within the first FLA range that targets the data;

composing, by the source node, a remote access request that includes the FLA;

transmitting, by the source node, the remote access request to the destination node; and mapping, by a second TLB within the destination node, the FLA to a corresponding SPA that targets the data within the local SPA space.

\* \* \* \* \*